(12) United States Patent
Kerep et al.

(10) Patent No.: US 10,738,225 B2
(45) Date of Patent: Aug. 11, 2020

(54) METHOD FOR JOINING TWO WEBS TOGETHER WITH AN ADHESIVE TAPE

(71) Applicant: TESA SE, Norderstedt (DE)

(72) Inventors: Patrick Kerep, Hamburg (DE); Ilse Rodewald, Münster (DE); Stephan Bernt, Hamburg (DE)

(73) Assignee: TESA SE, Norderstedt (DE)

( * ) Notice: Subject to any disclaimer, the term of this patent is extended or adjusted under 35 U.S.C. 154(b) by 380 days.

(21) Appl. No.: 15/290,388

(22) Filed: Oct. 11, 2016

(65) Prior Publication Data

US 2017/0029666 A1   Feb. 2, 2017

Related U.S. Application Data

(62) Division of application No. 14/673,975, filed on Mar. 31, 2015, now abandoned.

(30) Foreign Application Priority Data

Apr. 2, 2014  (DE) .................... 10 2014 206 349

(51) Int. Cl.
*B65H 19/18* (2006.01)
*C09J 7/22* (2018.01)
(Continued)

(52) U.S. Cl.
CPC ........ *C09J 133/02* (2013.01); *B65H 19/1842* (2013.01); *C09J 5/00* (2013.01); *C09J 7/201* (2018.01); *C09J 7/22* (2018.01); *C09J 7/243* (2018.01); *C09J 7/255* (2018.01); *C09J 7/38* (2018.01); *C09J 7/383* (2018.01); *C09J 7/401* (2018.01); *C09J 107/00* (2013.01); *C09J 109/06* (2013.01); *C09J 121/00* (2013.01); *B65H 19/102* (2013.01); *C09J 2203/342* (2013.01); *C09J 2205/114* (2013.01); *C09J 2407/00* (2013.01); *C09J 2409/00* (2013.01);
(Continued)

(58) Field of Classification Search
None
See application file for complete search history.

(56) References Cited

U.S. PATENT DOCUMENTS 2,750,315 A   4/1949  Tierney
3,787,531 A   1/1974  Dahlquist et al.
(Continued)

FOREIGN PATENT DOCUMENTS

DE   2 339 892 A1   4/1974
DE      2828673 A1 * 1/1980  ............. C09J 7/243
(Continued)

OTHER PUBLICATIONS

Espacenet machine translation of DE2828673A1, downloaded 2019. (Year: 2019).*

*Primary Examiner* — Mark A Osele
(74) *Attorney, Agent, or Firm* — Norris McLaughlin, P.A.

(57) ABSTRACT

The invention relates to an adhesive tape with a carrier composed of a film, there being applied on one side of the carrier an adhesive based on natural rubber or synthetic rubber, where the film is a biaxially oriented film made of polypropylene, polyethylene or polyester such as PET, and on the side of the carrier not coated with adhesive there is a release layer, based in particular on carbamate.

15 Claims, 3 Drawing Sheets

(51) Int. Cl.
*C09J 107/00* (2006.01)
*C09J 109/06* (2006.01)
*C09J 133/02* (2006.01)
*C09J 7/38* (2018.01)
*C09J 7/20* (2018.01)
*C09J 7/40* (2018.01)
*C09J 7/24* (2018.01)
*C09J 7/25* (2018.01)
*C09J 5/00* (2006.01)
*C09J 121/00* (2006.01)
*B65H 19/10* (2006.01)

(52) U.S. Cl.
CPC ...... *C09J 2421/00* (2013.01); *C09J 2423/006* (2013.01); *C09J 2433/00* (2013.01); *C09J 2467/006* (2013.01); *Y10T 428/266* (2015.01); *Y10T 428/2839* (2015.01)

(56) References Cited

U.S. PATENT DOCUMENTS

| | | | |
|---|---|---|---|
| 3,887,745 A | 6/1975 | Yoshii et al. | |
| 4,091,150 A * | 5/1978 | Roelofs | B24D 11/06 428/57 |
| 4,181,239 A | 1/1980 | Heiremans et al. | |
| 4,325,087 A * | 4/1982 | Moris | G11B 5/02 360/13 |
| 4,331,718 A | 5/1982 | Gleichechagen et al. | |
| 4,413,080 A * | 11/1983 | Blake | C09J 133/08 524/187 |
| 4,599,260 A | 7/1986 | Truskolaski et al. | |
| 4,675,582 A | 6/1987 | Hommes et al. | |
| 4,693,931 A * | 9/1987 | Andoh | G11B 5/70652 428/328 |
| 5,072,493 A | 12/1991 | Hommes et al. | |
| 5,145,718 A | 9/1992 | Pedginski et al. | |
| 5,254,393 A | 10/1993 | Murschall et al. | |
| 5,595,804 A * | 1/1997 | Korbel | B24D 11/06 428/109 |
| 5,942,299 A | 8/1999 | Tynan, Jr. et al. | |
| 6,511,742 B1 | 1/2003 | Muessig et al. | |
| 6,777,490 B2 | 8/2004 | Muessig et al. | |
| 6,811,869 B2 | 11/2004 | Luehmann et al. | |
| 6,815,069 B2 | 11/2004 | Hohberg et al. | |
| 2003/0039823 A1 | 2/2003 | Wenninger et al. | |
| 2003/0176613 A1 | 9/2003 | Hohberg et al. | |
| 2004/0126576 A1 | 7/2004 | Kinning et al. | |
| 2004/0127121 A1 * | 7/2004 | Schwab | C09J 7/22 442/46 |
| 2004/0151901 A1 * | 8/2004 | Pearson | B32B 7/12 428/343 |
| 2005/0142370 A1 | 6/2005 | Muessig | |
| 2007/0154706 A1 | 7/2007 | Muessig | |
| 2008/0113140 A1 * | 5/2008 | Shah | B32B 7/12 428/40.6 |
| 2009/0162701 A1 * | 6/2009 | Jensen | G11B 5/70 428/827 |
| 2011/0027552 A1 * | 2/2011 | Rodewald | B32B 27/32 428/212 |
| 2011/0067799 A1 | 3/2011 | Muessig et al. | |
| 2019/0218423 A1 * | 7/2019 | Bartusiak | C09J 7/385 |

FOREIGN PATENT DOCUMENTS

| | | | |
|---|---|---|---|
| DE | 28 45 541 A1 | 6/1980 | |
| DE | 36 24 921 A1 | 1/1988 | |
| DE | 101 32 534 A1 | 1/2003 | |
| EP | 1 336 683 B1 | 6/2008 | |
| GB | 953330 A * | 3/1964 | B29C 55/14 |

* cited by examiner

METHOD FOR JOINING TWO WEBS TOGETHER WITH AN ADHESIVE TAPE

This patent application claims priority of U.S. Nonprovisional application Ser. No. 14/673,975, filed Mar. 31, 2015, pending, which, in turn, claims priority of German Patent Application No. 10 2014 206 349.3, filed on Apr. 2, 2014, the entire contents of which patent applications are incorporated herein by reference.

The invention relates to an adhesive tape.

One of the uses of adhesive tapes is in producing a join between two flat materials in web form that have been wound into rolls, in the context of a static roll changeover.

Flat materials in web form, more particularly paper, are wound up into rolls, for supply, for example, to a paper-processing machine or to a printing and/or packaging machine. In the case of a static roll changeover, the rolls, such as a parent reel of paper, are stopped, meaning that their rotation is halted, the end of one parent reel is bonded to the start of the other, and the new parent reel is then set rotating again. The static reel changeover, carried out manually by production staff, from an empty to a full roll is a familiar procedure in paper mills or the like in order to give—among others—continuous paper webs. Within the paper industry, this procedure is employed, for example, on rewinders, roll splitters and cross-cutters. Static roll changeover is a complicated process, which must normally be performed by two specialists.

The join between old and new paper webs, referred to as a splice, is frequently retained in the paper web assembled in this way, and is supplied to an end customer. Irrespective of the nature of the webs being joined, their joining is referred to generally as splicing. For producing such joins, double-sided adhesive tapes, referred to as tabs, or single-sided adhesive tapes are known. Carriers used for the adhesive tapes are usually paper carriers, and also water-soluble self-adhesives, which are coated onto one or both sides of the carrier.

Where a double-sided adhesive tape is used for producing a join, the adhesive tape is adhered to the outer ply of the web material, substantially in the longitudinal direction of a full roll of the web material. Subsequently, on the side of the adhesive tape that is pointing radially outwards, the release paper or liner paper is peeled from the other self-adhesive, and the end of the web of the empty roll, such as the paper web of the empty parent reel, is adhered to the self-adhesive. Any residues of paper projecting can be cut off or torn off.

With single-sided adhesive tapes, half is bonded beneath the end of the topmost ply of one roll, in such a way that the half of the self-adhesive, viewed in the width of the adhesive tape, is essentially still available for bonding with the other web end. Advantageously, the single-sided adhesive tapes are provided with a centrally slit release paper or liner paper, allowing the bonds to be made in succession, with only one section of the release paper being removed in each case. Joining with single-sided adhesive tapes is used particularly with adhesive bonds which remain in a paper roll for a relatively long time. By virtue of their low thickness, they do not cause pressure points during the further processing of the paper web, and the elastic self-adhesive is not squeezed out laterally as a result of further processing.

The adhesive tapes used are distinguished by shear-resistant, usually water-soluble adhesives, since otherwise there is a risk of failure under the high tensile stresses, or the adhesive tapes, in the course of winding into rolls and of prolonged storage, squeeze out and thereby stick to the adjacent plies of paper—this can lead to problems during further processing; but on the other hand, because of their water-soluble self-adhesives and paper carriers, they cause no disruption in the paper machine when the paper wastes are re-used.

Also known are single-sided adhesive tapes provided with a splittable system on their reverse face, the face opposite to the self-adhesive coated onto the carrier. In this case, the splittable system, which essentially likewise comprises a double-sided adhesive tape, is adhered to the second-from-outer ply of the web material on the roll, in order thereby to fix the outer ply—half of which is adhered to the exposed self-adhesive on the adhesive tape—on the roll. As soon as the end of the old web is firmly stuck to the other half of the self-adhesive on the adhesive tape, and the web material is drawn, for example, into a paper-processing machine, the splittable system—preferably the carrier of this double-sided adhesive tape—is split by the forces which occur and which act substantially perpendicular to the principal plane of the adhesive tape; the outer ply is unwound from the roll and supplied to the machine; and the self-adhesive on the second-from-outer ply is covered in a non-adhesive way by the splittable system.

Adhesive tapes are also used to join webs, such as a first film web and a second film web, so as to give a correspondingly longer overall length ("running length"). The film web is then present preferably rolled up on a roll without interruptions in the desired running length.

The longer the resulting film web, the greater the extent to which a high productivity can be achieved in its use. There is also a reduction in fitting times or service times which are associated, for instance, with roll changeover.

One known method for joining film webs is "splicing", in which commercial self-adhesive tapes are mounted manually in order to stick two film webs together. Splicing with adhesive tape is cost-effective, can be done with a relatively high accuracy of matching of the film webs to one another, and the splice (the joining point or joining seam) possesses high strengths, especially tensile strength in the running direction of the film web. The tensile strength in the running direction of the film web is critical, since the forces which occur during the processing of film webs in, for example, printing machines, laminating machines, lining machines and hot-stamping machines, occur in the running direction, especially for the rapid transport of the film web.

Film splices of exactly this kind are needed in the production of adhesive tapes. The film webs to be coated with the adhesive are spliced to form a continuous web, which can be coated rapidly and without interruption.

In splicing, the ends of the webs to be joined may abut one another more or less directly, and so that two web ends to be joined are joined by means of an adhesive tape which is applied in such a way that it overlaps both edges. This splice is known as a so-called butt splice.

Furthermore, the web ends may also overlap, meaning that the adhesive tape is applied parallel to the end edge of the web on top such that the adhesive tape is bonded not only to the end section of the web on top but also, at the same time, to a section on the underlying web; the overlap edge is in this case located beneath the adhesive tape. This splice is called an overlap splice.

Furthermore, single-sided or double-sided adhesive tapes are used for roll end bonding in the papermaking and paper-processing industry.

When the usual fastening labels are used in combination with double-sided adhesive tapes, the risk exists of these labels tearing because of the stresses which may arise in the paper roll during storage.

The adhesive tapes used are distinguished in general likewise by shear-resistant, usually water-soluble adhesives, which on the one hand remove the risk of the failure of roll end bonding under the high tensile stresses which exist within a roll of paper, but on the other hand, by virtue of their water-soluble self-adhesives and paper carriers, do not cause disruption in the paper machine when the paper wastes are re-used.

Within the paper-processing industry, roll end bonding takes place a number of times—for example, after papermaking on the paper machine, after rewinding ahead of the coating machine, after coating on the coating machine, after calendering, after roll slitting, and before dispatch.

This roll closure operation, also known as "end tabbing", is known not only in the paper industry but also in film manufacture and in the metal industry as well (for example, in the case of coils made from rolled metal sheets).

Considered a disadvantage with adhesive tapes is the possibility, owing to the high tensile forces in the web material within the spliced web after the join has been produced, of the two web ends pulling apart at the adhesive join in the longitudinal direction of the web material. Consequently, the self-adhesive is exposed at the gap pulled open between the two web ends, and this adhesive may stick undesirably to the overlying web in the case, for example, of winding onto a new roll.

It is much more serious if the splice ruptures, in particular because the carrier in the adhesive tape is not stable enough to be able to accommodate the transverse forces (forces in the transverse direction of the adhesive tape carrier) that occur because of the high tensile forces. In particular, the carrier in the adhesive tape must be dimensioned such that it is able to absorb these forces as far as possible without stretching of the carrier.

The end of a roll of steel sheet as well develops a strong tendency to stand up from the roll, meaning that the adhesive closure tape must be able to accommodate very strong transverse forces in order not to rupture.

It is an object of the invention to provide an adhesive tape which has all of the required mechanical properties in order to find use, in particular, as an adhesive splicing tape or for end tabbing, with the adhesive tape, and especially the carrier, being able to absorb transverse forces acting on the adhesive tape, this tape at the same time satisfying the increasing requirements of environmentally benign production.

This object is achieved by means of an adhesive tape as characterized in more detail hereinbelow.

The invention accordingly provides an adhesive tape with a carrier composed of a film, there being applied on one side of the carrier an adhesive based on natural rubber or synthetic rubber, where the film is a biaxially oriented film made of polypropylene, polyethylene or polyester such as PET, and on the side of the carrier not coated with adhesive there is a release layer, based in particular on carbamate.

For the adhesive tape of the invention, oriented film carriers are used on account of the special mechanical demands. By means of orientation—synonymous with stretching of the primary film formed primarily in the manufacturing operation into one or more preferential directions—it is possible to exert a targeted influence on the mechanical properties. So-called biaxially oriented films may in one alternative be stretched sequentially, with the primary film, after having been formed by extrusion with a slot die, being stretched firstly in the machine direction, by being passed over a sequence of rollers, the transport speed of the film being greater than the speed on exit from the extrusion die. The film is subsequently stretched in the transverse direction in a drawing unit. Stretching of the film in two directions may also be performed in one step (compare, for example, U.S. Pat. Nos. 4,675,582 A and 5,072,493 A).

Likewise known as the stretching of BOPP carriers in a film-blowing process.

The principle of orienting lies in the aligning of the polymer molecule chains and of the crystal structures formed from them, and also in the aligning of the amorphous regions into particular preferential directions, and in the associated increase in strength. In principle, however, the strength is reduced in the direction in which no orientation takes place.

According to one preferred embodiment of the invention, the film consists of biaxially oriented polypropylene or biaxially oriented polyester such as polyethylene terephthalate.

The draw ratio on drawing of the film (especially in the case of films made of PE and PP) in the longitudinal direction (machine direction) is preferably 1:5 to 1:9, more preferably 1:6 to 1:7.5, very preferably 1:6 to 1:6.5.

The draw ratio on drawing of the film (likewise especially in the case of films made of PE and PP) in the transverse direction is preferably 1:5 to 1:10, more preferably 1:6 to 1:7.

With further preference, in the case of PE and PP films, the drawing is the same in longitudinal and transverse directions.

The draw ratio on drawing of the film (especially in the case of films made of PET) in the longitudinal direction (machine direction) is preferably 1:3.5 to 1:6, more preferably 1:4 to 1:5.

The draw ratio on drawing of the film (likewise especially in the case of films made of PET) in the transverse direction is preferably 1:3.5 to 1:6, more preferably 1:4 to 1:5.

With further preference, in the case of PET films, the drawing is the same in longitudinal and transverse directions.

A draw ratio of 1:6 indicates that a drawn-film section of 6 m in length is produced from a film section of, for example, 1 m in length. The draw ratio is often also designated as the quotient formed from the linear speed prior to stretching and the linear speed after stretching. The numerical figures used hereinafter relate to drawing.

Furthermore, the film may consist of blends of polyethylene and polypropylene. According to a further advantageous embodiment of the invention, the film comprises, at least in part, copolymers of propylene (in the case of polyethylene as principal monomer) and/or copolymers of polyethylene (in the case of polypropylene as principal monomer).

According to the most advantageous embodiment of the invention, the film consists of pure polyester.

Preferred film material is pure polypropylene or polyethylene, although copolymers of ethylene and polar monomers such as styrene, vinyl acetate, methyl methacrylate, butyl acrylate or acrylic acid are also included. The material may be a homopolymer such as HDPE, LDPE or MDPE or a copolymer of ethylene and another olefin such as propene, butene, hexene or octene (for example LLDPE, VLLDPE). Also suitable are polypropylenes (for example polypropylene homopolymers, random polypropylene copolymers, or polypropylene block copolymers).

The fraction (preferably weight-based) of the comonomer is always smaller than the fraction (preferably weight-based) of the principal monomer.

Additionally suitable, although fairly unsatisfactorily, as carrier material for the adhesive tape are also films such as those, for example, made of PA, PU or PVC. In accordance with the invention, however, all of these polymers are not preferred.

Conceivable in the sense of the invention are film laminates in which at least one film is selected from the group of
biaxially oriented polypropylene,
biaxially oriented polyethylene or
biaxially oriented polyester such as PET.

Where the use of the adhesive tape requires even higher strength or stretch resistance than that achievable by means of a film carrier alone, the carrier may be further reinforced by joining-on of fibre-like materials, especially individual filaments running in the machine direction, or woven filament fabrics or laid filament scrims. Methods known to the skilled person are the laying of aforementioned fibre-like materials onto a precoated film web, and subsequent coating, performed in a separate production step or else the same production step, with the adhesive that later on is actually the active adhesive.

The fibre-like reinforcing materials such as, for example, filaments or woven filament fabrics or laid filament scrims may therefore be mounted directly on the carrier (whether this carrier is made of film or is a textile carrier), incorporated into the carrier or incorporated into the adhesive.

The films advantageously possess an elongation at break in transverse direction of between 20% and 160%, in one particularly advantageous embodiment between 30% and 120%, with further preference between 60% and 100%. The elongation at break in transverse direction is also determined, correspondingly, in the transverse direction of the film.

Further advantageously, the films possess a thickness between 15 μm and 150 μm, in one particularly advantageous embodiment between 30 μm and 100 μm, with further preference 35 μm and 75 μm.

With further preference, the films at the same time have an elongation at break and also a thickness which lie within the stated limits.

The stated values for the elongation at break and the thickness here are valid in particular for biaxially oriented films.

It may be noted at this point that in the case of the adhesive tapes reinforced by joining-on of fibres and/or filaments preferably in machine direction, and/or by woven filament fabrics or laid filament scrims (for example cross-filaments), the elongation at break of the products is determined in general by the mechanics of the fibre materials and those of the filament geometries. Such products typically have elongations at break in longitudinal direction of 3% to 25%, with 5% to 8% being particularly preferred.

Carriers which can be used are, furthermore, all known textile carriers such as knitted fabrics, scrims, tapes, braids, tufted textiles, felts, woven fabrics (encompassing plain weave, twill and satin weave), knits (encompassing warp knits and other knits) or nonwoven webs, the term "nonwoven web" comprehending at least sheetlike textile structures in accordance with EN 29092 (1988) and also stitchbonded webs and similar systems. In accordance with the invention, these are not preferred.

The carrier preferably consists of exactly one film ply (besides the auxiliary layers still to be described, such as primer or release).

The carrier, however, may have, besides one film layer, one or two or more film plies. Preferred embodiments are those with up to five plies, preferably all formed from the same polymer, more preferably polyester.

Each of these films may also consist of other polymers or of blends of two or more polymers.

In accordance with another advantageous embodiment, the film is opaque.

The carrier, furthermore, may be coloured.

The carrier is preferably coloured as a result of the use of dyes and/or pigments. Where reference is made hereinafter only to dyes or pigments, respectively, it is evident to the skilled person that both are meant.

Suitable coloured pigments are, in particular, those which are in finely divided form, examples being general-purpose pigments, fluorescent colour pigments and afterglow pigments.

Examples are carbon black, titanium dioxide, calcium carbonate, zinc carbonate, zinc oxide, silicates or silica, also mica, especially copper hydroxide phosphate, or else Iriodin, a pearlescent pigment based on basic lead carbonate. The additive, furthermore, may be a thermochromic dye.

The pigment may be based on anthraquinone. Anthraquinone dyes are an extensive group of highly lightfast dyes with various constitutions, all deriving from anthraquinone by substitution or by fusing-on of further ring systems (for example acridones, carbazoles, thiazoles, thiophene derivatives, azines, fused ring systems and the like).

They include aminoanthraquinone pigments and hydroxyanthraquinone pigments, and also heterocyclic and polycarbocyclic anthraquinone pigments.

The pigment may further consist of an azo compound. All azo dyes have the general formula R1-N=N—R2, where the two radicals R1 and R2 may be identical or different.

These dyes are admixed to the base polymers forming the carrier, preferably forming the carrier film, in an order of magnitude in particular of several parts per thousand (starting from 3 parts per thousand) up to a maximum of 10 wt %, preferably in amounts from 1 to 10 wt %, more particularly from 2 to 4 wt %, based on the total weight of the carrier layer.

As carriers for the adhesive tape it is possible to use the above-described films directly, with the side that is later to be coated with the adhesive generally being subjected to a fluorine treatment, a plasma treatment, a corona pretreatment or else flame pretreatment, in order to anchor the adhesive more effectively on the carrier.

A further improvement in the adhesion, synonymous with the anchoring of the adhesive on the carrier and therefore with the prevention of transfer of adhesive to the reverse of the carrier during unwinding of the rolls (or as an alternative treatment), may be accomplished through the use of primers (also called adhesion promoters). Primers which can be used are the known dispersion systems and solvent systems, based for example on isoprene- or butadiene-containing rubbers and/or cyclo rubbers. Isocyanates or epoxy resins as additives improve the adhesion and in some cases also increase the shear strength of the pressure-sensitive adhesive. Isocyanate-crosslinked primers are preferred.

With these primers it is possible, firstly, to tailor the surface energy in line with objectives, and, secondly, to pursue chemical attachment of the adhesive component to the carrier in the case, for example, where isocyanate-containing primers are used.

The normal application weight of the primer per unit area is between 0.01 and 10 g/m$^2$, preferably between 0.01 and 3 g/m$^2$, more preferably between 0.05 and 0.2 g/m$^2$.

Another possible way of improving the anchoring lies in the use of carrier films which by means of coextrusion have been equipped specifically with a polymer surface favourable for the attachment to the pressure-sensitive adhesive.

The adhesive applied to the carrier material is preferably a pressure-sensitive adhesive, in other words an adhesive which permits a durable bond to virtually all substrates even under relatively weak applied pressure and which, after use, can be detached from the substrate again substantially without residue. At room temperature, a pressure-sensitive adhesive is permanently tacky, thus having a sufficiently low viscosity and a high initial tack, allowing the surface of the bonding base in question to be wetted even under low applied pressure. The adhesive bondability of the adhesive derives from its adhesive properties, and the redetachability from its cohesive properties.

In order to produce an adhesive tape from the carrier, natural or synthetic rubber-based adhesives are employed.

Preferred for use is an adhesive which is from the group of the natural rubbers or consists of any desired blend of natural rubbers and synthetic rubbers, the fraction of the synthetic rubber in the blend being smaller, according to one preferred variant, than the fraction of the natural rubber.

(Natural) rubber adhesives exhibit a good combination of bond strength, tack and cohesion, and also display balanced bonding performance on virtually all relevant substrates, and are therefore predestined. General information on rubber adhesives can be found in publications including standard works for adhesive tapes, such as the "Handbook of Pressure Sensitive Adhesive Technology", by Donatas Satas, for example.

The natural rubber or natural rubbers may be selected in principle from all available grades such as, for example, crepe, RSS, ADS, TSR or CV types, depending on required purity level and viscosity level, and the synthetic rubber or synthetic rubbers may be selected from the group of randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA) and polyurethanes and/or blends thereof.

The polymer of the adhesive preferably consists of natural rubber, and with further preference there is in fact no other polymer than natural rubber present in the pressure-sensitive adhesive.

In this case the pressure-sensitive adhesive is a composition composed of natural rubber, one or more tackifier resins and optionally ageing inhibitor(s).

Furthermore, other elastomers may also have been added to the adhesive.

The fraction of the natural rubber or of the blend of natural rubbers and synthetic rubbers in the elastomers is preferably 100 wt %, more preferably at least 80 wt %, very preferably at least 50 wt %.

With further preference, the fraction of the synthetic rubber is smaller than that of the natural rubber in the aforementioned elastomer mixtures as well.

Additionally with preference, thermoplastic elastomers may be added to the rubbers in order to improve processing properties, in a weight fraction of 10 to 50 wt %, this figure being based on the total elastomer fraction.

Representative mention may be made at this point in particular of the particularly compatible styrene-isoprene-styrene (SIS) and styrene-butadiene-styrene (SBS) types. Suitable elastomers for blending are also, for example, EPDM or EPM rubber, polyisobutylene, butyl rubber, ethylene-vinyl acetate, hydrogenated block copolymers of dienes (for example by hydrogenation of SBR, cSBR, BAN, NBR, SBS, SIS or IR; such polymers are known as SEPS and SEBS, for example) or acrylate copolymers such as ACM.

Crosslinking may take place thermally or by irradiation with UV light or electron beams.

For the purpose of thermally induced chemical crosslinking it is possible to utilize all known thermally activatable chemical crosslinkers such as accelerated sulphur systems or sulphur donor systems, isocyanate systems, reactive melamine resins, formaldehyde resins and (optionally halogenated) phenol-formaldehyde resins and/or reactive phenolic resin or diisocyanate crosslinking systems with the corresponding activators, epoxidized polyester resins and acrylate resins, and also combinations thereof.

The crosslinkers are activated preferably at temperatures above 50° C., more particularly at temperatures from 100° C. to 160° C., very preferably at temperatures from 110° C. to 140° C.

The crosslinkers may also be excited thermally by IR rays or high-energy alternating fields.

It is possible alternatively to use solvent-based adhesives, aqueous-based adhesives, or else adhesives in the form of a hotmelt system.

In order to optimize the properties, it is possible for the self-adhesive employed to have been blended with tackifiers (resins) and/or with one or more adjuvants such as plasticizers, fillers, pigments, UV absorbers, light stabilizers, ageing inhibitors, crosslinking agents, crosslinking promoters or elastomers.

Tackifiers are, for example, in particular hydrogenated and non-hydrogenated hydrocarbon resins (for example from unsaturated $C_5$ or $C_7$ monomers), terpene-phenolic resins, terpene resins from raw materials such as α- or β-pinene and/or δ-limonene, aromatic resins such as indene-coumarone-resins or resins from styrene or α-methylstyrene such as rosin and its derivatives such as disproportionate, dimerized or esterified resins, in which case glycols, glycererol or pentaerythritol may be used. Particularly suitable are resins that are stable to ageing and are without an olefinic double bond, such as hydrogenated resins, for example.

Express reference is made to the representation of the state of knowledge in "Handbook of Pressure Sensitive Adhesive Technology" by Donatas Satas (van Nostrand, 1989).

Examples of suitable fillers and pigments are fibres, carbon black, zinc oxide, titanium dioxide, solid microbeads, solid or hollow glass beads, silica, silicates, chalk, calcium carbonate and/or zinc carbonate.

Suitable ageing inhibitors (antiozonants, antioxidants, light stabilizers, etc.) for the adhesives are primary antioxidants such as, for example, sterically hindered phenols, secondary antioxidants such as, for example, phosphites or thiosynergists (thioethers), and/or light stabilizers such as, for example, UV absorbers or sterically hindered amines.

Suitable plasticizers are, for example, aliphatic, cycloaliphatic and aromatic mineral oils, diesters or polyesters of phthalic acid, trimellitic acid or adipic acid, liquid rubbers, for example nitrile rubbers or polyisoprene rubbers), liquid polymers of butane and/or isobutene, acrylic esters, polyvinyl ethers, liquid resins and plasticizer resins based on the raw materials for tackifier resins, wool wax and other waxes, or liquid silicones.

Crosslinking agents are, for example, phenolic resins or halogenated phenolic resins, melamine resins and formaldehyde resins. Suitable crosslinking promoters are, for example, maleimides, allyl esters such as triallyl cyanurate, and polyfunctional esters of acrylic and methacrylic acids.

The substances recited are in turn not mandatory; the adhesive works even without their addition, individually or in any combination, in other words without resins and/or residual adjuvants.

The coating thickness with adhesive is preferably in the range from 5 to 250 g/m$^2$, more particularly 15 to 100 g/m$^2$, more preferably in the range from 15 to 60 g/m$^2$.

Pressure-sensitive adhesives may be produced and processed from solution, from dispersion and from the melt. Preferred production and processing procedures take place from solution or dispersion.

The pressure-sensitive adhesives thus produced can then be applied to the carrier using the commonly known methods. In the case of processing from the melt, this may be application methods involving a nozzle or a calendar.

In the case of procedures from solution, known coating techniques involve knives, doctor blades or nozzles, to mention just a few.

The reverse face of the adhesive tape may have had a reverse-face varnish applied to it, in order to exert a favourable influence over the unwind properties of the adhesive tape wound to form an Archimedean spiral. For this purpose, this reverse-face varnish may have been equipped with silicone or fluorosilicone compounds and also with polyvinylstearylcarbamate, polyethyleneiminestearylcarbamide or organofluorine compounds as substances with abhesive (anti-adhesive) effect. A carbamate-based system is preferred.

Suitable release agents include surfactant-based release systems based on long-chain alkyl groups such as stearyl sulphosuccinates or stearyl sulphosuccinamates, but also polymers, which may be selected from the group consisting of polyvinylstearylcarbamates, polyethyleneiminestearylcarbamides, chromium complexes of $C_{14}$ to $C_{28}$ fatty acids, and stearyl copolymers, as described for example in DE 28 45 541 A. Likewise suitable are release agents based on acrylic polymers with perfluorinated alkyl groups, silicones or fluorosilicone compounds, for example based on poly(dimethylsiloxanes). With particular preference the release layer comprises a silicone-based polymer. Particularly preferred examples of such silicone-based polymers with release effect include polyurethane-modified and/or polyurea-modified silicones, preferably organopolysiloxane/polyurea/polyurethane block copolymers, more preferably those as described in Example 19 of EP 1 336 683 B1, very preferably anionically stabilized polyurethane-modified and urea-modified silicones with a silicone weight fraction of 70% and an acid number of 30 mg KOH/g. An effect of using polyurethane-modified and/or urea-modified silicones is that the products of the invention combine optimized ageing resistance and universal writability with an optimized release behaviour. In one preferred embodiment of the invention, the release layer comprises 10 to 20 wt %, more preferably 13 to 18 wt %, of the release-effect constituent.

Descriptions of the adhesives commonly used for adhesive tapes and also of release varnishes and primers, are found in, for example, "Handbook of Pressure Sensitive Adhesive Technology" by Donatas Satas (van Nostrand, 1989).

The general expression "adhesive tape" in the context of this invention encompasses all sheetlike structures such as two-dimensionally extended sections, tape with extended length and limited width, tape sections and the like, and also, lastly, diecuts or labels.

The adhesive tape may be produced in the form of a roll, in other words in the form of an Archimedean spiral wound up onto itself, or with lining with release materials, such as siliconized paper or siliconized film, on the adhesive side.

Suitable release material is preferably a non-linting material such as a polymeric film or a well-sized, long-fibre paper.

The adhesive tapes have, in particular, running lengths of 1000 to 30 000 m. Roll widths selected are usually 10, 15, 19, 25 and 30 cm.

The product consists of a film (a) and an adhesive (b). Used additionally there may also be a primer (c) for improving the adhesion between adhesive and carrier, and a reverse-face release (d).

Figure 2:
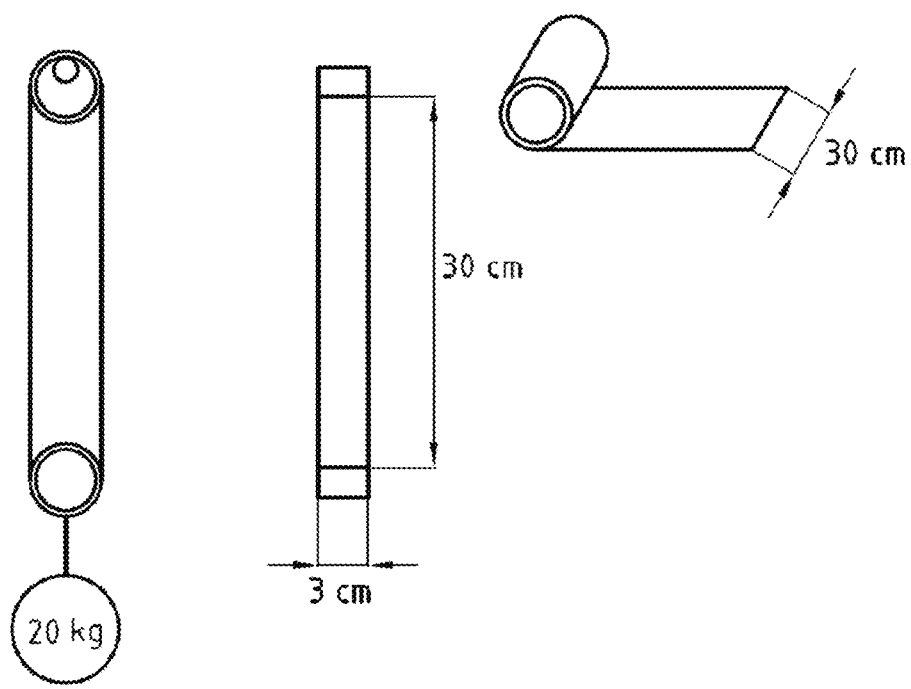

FIG. 2 illustrates measurement of the shear strength in a transverse direction, wherein a strip of the corresponding film 3 cm wide is wound around two cylinders and joined to an adhesive tape, to form a loop.

Figure 3:
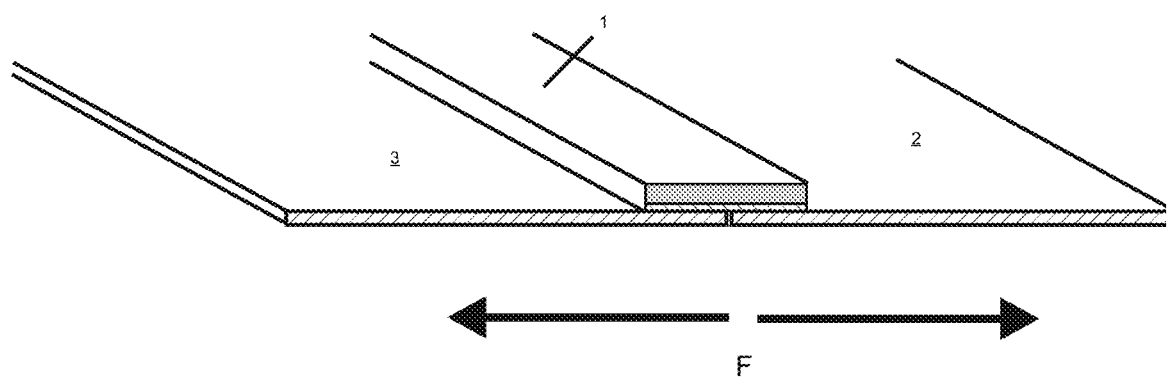

FIG. 3 shows the adhesive tape in the formation of a butted splice.

Figure 4:
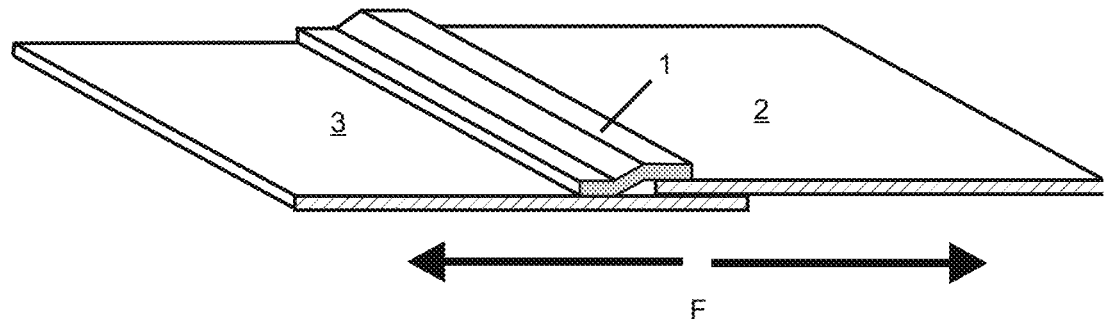

FIG. 4 shows the adhesive tape in the formation of an overlapping splice.

The carrier (a) consists of a polyester film having a thickness of 50 μm.

The adhesive (b) comprises a mixture of natural rubber and also of various resins, and may optionally also include plasticizers, fillers and ageing inhibitors.

Particularly preferred embodiments of the invention show an adhesive tape having a film carrier with a thickness of between 30 and 55 μm, preferably 36 and 50 μm, made from polyester such as polyethylene terephthalate, applied on which there is a natural rubber adhesive (i.e. fraction of natural rubber in the elastomers forming the adhesive is at least 50%).

With further preference there is a carbamate release applied on the open side of the carrier, the side opposite from the adhesive.

The invention describes an adhesive tape which is used to form a splice between two webs, in particular between two film webs. Furthermore, it is also suitable as an adhesive tape for closing rolls of paper or metal webs.

Splicing is accomplished preferably by half of the adhesive tape being bonded over the end of the topmost ply of one roll in such a way that the half of the (self-) adhesive, viewed in the width of the adhesive tape, is essentially still available for bonding to the other web end. For forming a butted splice as well, the adhesive tape, according to one preferred variant, is bonded in such a way that the adhesive tape lies in equal parts, as far as possible, on the two web ends.

The adhesive tape is outstandingly capable of accommodating and counteracting the transverse/shearing forces that act on the adhesive tape, without the carrier stretching.

The adhesive tape will be elucidated in more detail below, with reference to a number of figures, without wishing thereby to impose any limitation of whatever kind.

FIG. 3 shows the adhesive tape 1 in the formation of a butted splice for generating a continuous film web. For this purpose, two film web ends 2, 3, which abut one another directly, are joined by means of the adhesive tape 1 in such a way that the adhesive tape overlaps both edges of the film web ends 2, 3. The film web ends 2, 3 continue left to left or right "infinitely", until the next splice is needed, in order to join together the film web ends there to the next film web.

In the course of winding and unwinding of the film web, the tensile forces F shown act on the adhesive tape 1 in transverse direction, and act on the splice. The adhesive tape 1, and more particularly the carrier, must be dimensioned in such a way that these tensile forces can be accommodated and transferred, without the adhesive tape 1 suffering adhesive failure and without there being any tearing of the carrier.

FIG. 4 shows the adhesive tape 1 in the formation of an overlapping splice.

The film web ends 2, 3 overlap in such a way that the adhesive tape 1 is applied parallel to the end edge of the top web 2 in such a way that the adhesive tape 1 is bonded both on the end piece of the top web 2 and also, at the same time, on a section on the bottom web 3. The overlap edge is located below the adhesive tape 1.

In the formation of this splice too, the adhesive tape 1 must be designed such that it is able to accommodate the tensile forces F occurring, which act in the transverse direction of the adhesive tape, without failure occurring.

Figure 1:
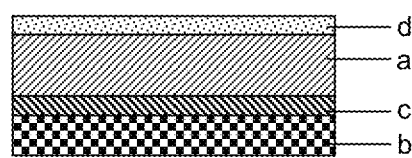
FIG. 1 shows a typical construction of the adhesive tape of the invention.

Sectionally in the transverse direction (cross section), FIG. 1 shows the adhesive tape, which consists of a film carrier (a), bearing on one side an applied layer of a self-adhesive coating (b).

The invention is elucidated in more detail below by an example, without wishing thereby to limit the invention.

EXAMPLE 1, SPECIMEN H IN THE TABLE

50 µm PET film, e.g. Hostaphan RNK 50
50 g/m² adhesive (NR-based pressure-sensitive adhesive)
carbamate release

| Raw material | Adhesive NR A weight fractions | Adhesive NR B weight fractions |
| --- | --- | --- |
| Natural rubber V145 | 47 | 52 |
| Dertophene T 110 | 12 | 12 |
| Dercolyte S115 | 21 | 22 |
| Erkazit 165 | 10 | 10 |
| ZnO powder | 5 | 5 |

Dercolyte S 115 is a terpene resin based on β-pinene.
Dertophene T 110 is a terpene-phenolic resin.
Erkazit 165 is a zinc resinate.

The properties of the adhesive tape are as follows:
The adhesive tape adheres well to films of all kinds such as, for example PE, PP, PET (high bond strength).

The adhesive of the adhesive tape has sufficient shear strength to fix a splice of two film flaps, which are arranged with an overlap, the adhesive tape being bonded on the overlap in such a way that the machine direction of the adhesive tape extends parallel to the overlap, over periods of more than 3 days, preferably more than 7 days. The test is then discontinued, without failure being observed.

The adhesive tape withstands the temperature range occurring under transport conditions, of −20° C. to +50° C. (thermal stability).

The adhesive tape has a very high tensile strength, and so is able to withstand the forces which occur when a splice is formed.

The adhesive tape does not suffer excessive stretching.

A total of eight specimens of adhesive tapes were produced, all with a polyester carrier, on which various pressure-sensitive adhesives were applied in different thicknesses. These specimens A to G correspond otherwise in their construction to the specimen H known from Example 1.

| Specimen | Pressure-sensitive adhesive | Coatweight [g/sqm] | Carrier/ thickness [µm] | Time to failure [h] |
| --- | --- | --- | --- | --- |
| A | SIS | 100 | PET 36 µm | 6 |
| B | SIS | 100 | PET 50 µm | 5 |
| B | Acrylic | 50 | PET 50 µm | 11 |
| C | Acrylic | 50 | PET 36 µm | 15 |
| D | Acrylic | 30 | PET 36 µm | 10 |
| E | NR A | 30 | PET 36 µm | >72 |
| F | NR B | 30 | PET 36 µm | >72 |
| G | NR B | 30 | PET 50 µm | >72 |
| H | NR B | 50 | PET 50 µm | >72 |

The "time to failure" was determined by the method for measuring the shear strength in transverse direction.

Adhesive tapes A to D show satisfactory behaviour. The shear strength is sufficient to withstand the tension in the formation of a splice for at least several hours.

The functioning of specimens E to H is extremely outstanding (the latter specimen is that shown in Example 1).

Test Methods

The measurements are carried out (unless indicated otherwise) under test conditions of 23±1° C. and 50±5% relative humidity.

Bond Strength

The determination of the bond strength (in accordance with AFERA 5001) was carried out as follows: The defined substrate used was galvanized steel sheet with a thickness of 2 mm (obtained from Rocholl GmbH). The bondable sheetlike element under test was cut to a width of 20 mm and a length of about 25 cm, provided with a handling section, and pressed immediately thereafter five times using a 4 kg steel roller, with a rate of advance of 10 m/min, onto the respectively selected substrate. Immediately after that, the bondable sheetlike element was peeled from the substrate at an angle of 180° using a tensile testing instrument (from Zwick), and the force required to achieve this at room temperature was recorded. The recorded value (in N/cm) resulted as the average from three individual measurements.

Thickness

The thickness is measured according to DIN 53370.

Tensile Elongation Behaviour

The tensile elongation behaviour is tested unless otherwise indicated in machine direction (MD, running direction). The tensile strength is expressed in MP and the elongation at break in %; both values are measured in accordance with DIN 53455-7-5. The test results, particularly the elongation at break, can be made statistically reliable by a sufficient number of measurements.

The 1% or 10% stretch is determined according to DIN 53455-7-5 in the longitudinal direction.

Measurement of the Shear Strength in Transverse Direction

A strip of the corresponding film 3 cm wide is wound around two cylinders and joined, as depicted in FIG. 2, to an adhesive tape, to form a loop. The ends of the film are arranged abutting, and so the bond area on each side of the butt joint is 3 cm×15 cm. The construction is then suspended from a steel rod and loaded with a weight of 20 kg via the lower cylinder. The time taken for the loop to open, in other words for the adhesive tape to fail completely, is recorded.

This test simulates the shearing forces which act on the adhesive tape in its inventive use, in the formation of a film splice, for example.

The invention claimed is:

1. A method comprising joining a first thermoplastic film web to a second thermoplastic film web with an adhesive tape, wherein:
   the adhesive tape comprises a carrier comprising a film comprising a first side and a second side;
   the film is a biaxially-oriented film comprising a polypropylene, a polyethylene, or a polyester;
   an adhesive based on a natural rubber is disposed on the first side; and
   a release layer based on a carbamate is disposed on the second side.

2. Method according to claim 1, wherein:
   the film has a longitudinal direction and a transverse direction; and
   a draw ratio on drawing the film in the longitudinal direction is 1:5 to 1:9, and/or a draw ratio on drawing the film in the transverse direction is 1:5 to 1:10.

3. Method according to claim 1, wherein:
   the film has a longitudinal direction and a transverse direction; and
   a draw ratio on drawing the film in the longitudinal direction is 1:3.5 to 1:6, and/or a draw ratio on drawing the film in the transverse direction is 1:3.5 to 1:6, and/or a draw ratio on drawing the film is the same in the longitudinal direction and the transverse direction.

4. Method according to claim 1, wherein the adhesive tape further comprises a filament, a woven filament fabric, a laid filament scrim, or a combination thereof.

5. Method according to claim 1, wherein the carrier has a thickness between 30 and 55 µm.

6. Method according to claim 1, wherein the adhesive based on the natural rubber comprises a tackifier resin.

7. Method according to claim 1, wherein the adhesive based on the natural rubber comprises at least one UV protectant and/or at least one blending component.

8. Method according to claim 1, wherein at least one of the first thermoplastic film web and the second thermoplastic film web independently comprises a homopolymer, a copolymer of ethylene, a copolymer of propylene, a copolymer of ethylene and propylene, a copolymer of ethylene and a polar monomer, a copolymer of ethylene and an olefin, a polyester, or a blend of polyethylene and polypropylene.

9. Method according to claim 8, wherein:
   at least one of the first thermoplastic film web and the second thermoplastic film web comprises a homopolymer; and
   the homopolymer comprises a polyethylene or a polypropylene.

10. Method according to claim 9, wherein:
    the homopolymer comprises a polyethylene; and
    the polyethylene comprises a high-density polyethylene, a medium-density polyethylene, a low-density polyethylene, a linear low-density polyethylene, or a very low-density polyethylene.

11. Method according to claim 8, wherein:
    at least one of the first thermoplastic film web and the second thermoplastic film web comprises a polypropylene; and
    the polypropylene comprises a polypropylene homopolymer, a random polypropylene copolymer, or a polypropylene block copolymer.

12. Method according to claim 8, wherein:
    at least one of the first thermoplastic film web and the second thermoplastic film web comprises a copolymer of ethylene and a polar monomer; and
    the polar monomer comprises a styrene, a vinyl acetate, a methyl methacrylate, a butyl acrylate, or an acrylic acid.

13. Method according to claim 8, wherein:
    at least one of the first thermoplastic film web and the second thermoplastic film web comprises a copolymer of ethylene and an olefin; and
    the olefin comprises a propene, a butene, a hexene, or an octene.

14. Method according to claim 8, wherein:
    at least one of the first thermoplastic film web and the second thermoplastic film web comprises a polyester; and
    the polyester comprises a polyethylene terephthalate.

15. A method comprising joining a first thermoplastic film web to a second thermoplastic film web with an adhesive tape, wherein:
    the adhesive tape comprises a carrier comprising a film comprising a first side and a second side;
    the film is a biaxially-oriented film comprising polypropylene, polyethylene, or polyester;
    an adhesion promoter is disposed between the first side and an adhesive based on a natural rubber; and
    the adhesive based on the natural rubber is disposed in a layer.

* * * * *